(12) United States Patent
Kunert et al.

(10) Patent No.: US 7,392,667 B2
(45) Date of Patent: Jul. 1, 2008

(54) METHOD AND AN APPARATUS FOR SHAPING A TUBULAR OBJECT MADE OF THERMOPLASTIC MATERIAL

(75) Inventors: Christian Kunert, Mainz (DE); Friedrich Lampart, Heiden (CH); Jurgen Thurk, Mullheim (DE); Michael Plapp, Egnach (CH); Roman Oberhaensli, Schweiz (CH)

(73) Assignee: Schott AG (DE)

( * ) Notice: Subject to any disclaimer, the term of this patent is extended or adjusted under 35 U.S.C. 154(b) by 606 days.

(21) Appl. No.: 10/284,864

(22) Filed: Oct. 30, 2002

(65) Prior Publication Data

US 2003/0106339 A1   Jun. 12, 2003

(30) Foreign Application Priority Data

Nov. 22, 2001   (DE) ................................ 101 57 258

(51) Int. Cl.
C03B 23/04 (2006.01)
C03B 23/09 (2006.01)
C03B 23/043 (2006.01)
C03B 23/045 (2006.01)

(52) U.S. Cl. .............................. 65/109; 65/108; 65/110; 65/276; 65/277; 65/282; 65/296; 65/297; 65/298

(58) Field of Classification Search ................ 65/25.4, 65/169, 296, 108, 109, 110, 297, 298, 276, 65/277, 282

See application file for complete search history.

(56) References Cited

U.S. PATENT DOCUMENTS 3,186,818 A * 6/1965 Havens et al. ................. 65/169
3,202,495 A * 8/1965 Zauner ......................... 65/277
3,254,981 A * 6/1966 Havens ......................... 65/359
3,257,186 A * 6/1966 Zauner ......................... 65/109
3,293,018 A * 12/1966 Doty ............................ 65/109
3,298,808 A * 1/1967 Macks ......................... 65/25.1

(Continued)

FOREIGN PATENT DOCUMENTS

DE         2852406       *  7/1980

(Continued)

OTHER PUBLICATIONS

Banhart, J., "Manufacture, characterisation adn application of cellular metals and metal foams", Progress in Materials Science, 46 (2001) 559-632.*

Primary Examiner—Steven P Griffin
Assistant Examiner—Jason L. Lazorcik
(74) Attorney, Agent, or Firm—Fitch, Even, Tabin & Flannery

(57) ABSTRACT

The invention relates to a method for shaping a tubular object made of glass or glass ceramics or any other thermoplastic material, comprising the following method steps:
  the object is heated up to softening;
  an inner shaping tool and an outer shaping tool are provided for shaping The outside and inside jacket surface of the object, of which at least the inner shaping tool consists at least in the region of its shaping surface of open-pored material with a permeability of between $10^{-11}$ and $10^{-16}$ m$^2$;
  a free-flowing pressurized medium is conducted through the open-pored material towards the surface of the object to be shaped;
  the inner shaping tool is introduced into the object;
  the outer shaping tool is applied on to the object in order to shape the same 2 Claims, 1 Drawing Sheet

U.S. PATENT DOCUMENTS

| | | | | |
|---|---|---|---|---|
| 3,360,352 A | * | 12/1967 | Sundstrom et al. | 65/109 |
| 3,362,435 A | * | 1/1968 | Meyer | 138/178 |
| 3,368,588 A | * | 2/1968 | Meyer | 138/178 |
| 4,247,319 A | * | 1/1981 | Hofmann | 65/109 |
| 4,385,919 A | * | 5/1983 | Goffredi et al. | 65/109 |
| 4,682,996 A | * | 7/1987 | Foster et al. | 65/25.1 |
| 5,078,769 A | * | 1/1992 | Trier | 65/25.1 |
| 5,350,433 A | * | 9/1994 | Baniel | 65/388 |
| 5,366,528 A | * | 11/1994 | Mann | 65/25.1 |
| 5,683,482 A | * | 11/1997 | Fredholm | 65/25.1 |
| 5,788,733 A | * | 8/1998 | Dieckow | 65/292 |
| 6,016,843 A | * | 1/2000 | Wada et al. | 138/109 |
| 6,062,047 A | * | 5/2000 | Fredholm et al. | 65/488 |
| 6,134,920 A | * | 10/2000 | Hjertman et al. | 65/108 |
| 6,360,415 B1 | * | 3/2002 | Wada et al. | 29/283.5 |
| 6,370,916 B1 | * | 4/2002 | Yabuki | 65/109 |
| 6,536,239 B1 | * | 3/2003 | Mueller et al. | 65/292 |
| 6,640,587 B1 | * | 11/2003 | Hollesen et al. | 65/169 |
| 6,769,276 B1 | * | 8/2004 | Kay et al. | 65/529 |
| 6,789,398 B1 | * | 9/2004 | Daoud et al. | 65/357 |

FOREIGN PATENT DOCUMENTS

EP  0189997  8/1986

* cited by examiner

METHOD AND AN APPARATUS FOR SHAPING A TUBULAR OBJECT MADE OF THERMOPLASTIC MATERIAL

The invention relates to the shaping of tubular objects made of glass or glass ceramics as well as other of thermoplastic materials.

Numerous glass objects are known which are produced from tubes in a shaping process. To be mentioned are especially small glass bottles which are used for pharmaceutical applications for example. Standard ground glass joint parts for chemical apparatuses or threaded bushes made of glass are produced similarly.

In the production of a large number of glass products, glass tubes are used as semi-finished products. Usually, one end of the glass tube is heated up to temperatures at which the glass can be deformed. Alternatively, a short tube section can be heated at both ends, so that two products can be produced simultaneously in one work pass. After the heating of the tube end(s), a mandrel is introduced into each end which acts as an inner shaping tool and ensures the inner diameter of the desired glass part and defines the inner geometry. The actual shaping is performed from externally acting tools such as shaping cheeks or rollers which act as external shaping tools and which press the glass against the mandrel while the glass tube and/or the external shaping tools rotate for example. The shape of the external tools is thus transferred onto the outside of the glass part to be produced, whereas simultaneously the geometry of the mandrel shapes the inside of the glass part. The contact between the external shaping tools, the glass and the mandrel is usually maintained for such a time until the glass part has solidified sufficiently and no longer deforms automatically during the further processing.

The mandrel introduced into the hot glass tube is subjected to very high stresses. Usually, only temperature-resistant steels are used due to the high temperatures.

At the same time, it is prevented by using a lubricant such as oil, a paste or emulsion that the glass is damaged on the inside of the end to be shaped by the high friction.

The outer shaping tools are usually also oiled for cooling and lubrication. The lubricant causes various problems:

Often the lubricant burns up incompletely, which leads to residues especially on the mandrel and requires regular cleaning during which production needs to be interrupted. The gaseous combustion products which are generally hazardous, require a high amount of suction and lead to respective costs. Moreover, the application of the lubricant during the production is a possible source of errors, because excessive lubricant exacerbates the said problems, but lack of lubrication leads to defective products.

The invention is based on the object of providing a method and an apparatus with which the inside geometry and outside geometry of the tubular part of the glass object can be produced in a defined manner, namely in continuous operation and without using lubricant such as oil or pastes This object is achieved by the features of the independent claims.

The basic idea of the invention is the application of a novel mandrel. In this mandrel, all surfaces which produce the shaping of the glass in conventional mandrels are made from a gas-permeable, preferably porous material. An integrated gas feed is used to charge the surfaces from the sides averted from the glass with a gas under overpressure, so that a gas emerges from the shaping surfaces, In addition, the external shaping tools can also be provided with shaping surfaces on which a glass film forms.

If the inside shape of the component to be produced by the mandrel deviates from a cylinder in that inside grooves or undercuts are present on the inside shape for example, parts of the mandrel can be provided with a movable arrangement in such a way that after the introduction of the mandrel into the soft glass tube end they are brought into their actual shaping position, perform the shaping there and are moved to a position again prior to the removal from the shaped tube end which allows the removal of the mandrel from the finished part. For example, the mandrel can be provided with a split or collapsible arrangement, or can be provided with a rotatable arrangement in parts. All shaping surfaces can be arranged in this case in such a way that during the shaping a glass film is formed and no lubricant is necessary.

When using very fine-pored materials, a very thin but still supportive gas film is formed which prevents the contact between the glass and the shaping surfaces. Oils or other pastes for lubricating the mandrels are thus no longer necessary.

The parts of the mandrel and optionally the external shaping tools on which the gas cushion is formed during the operation are made for example of porous ceramic materials such as SiC, Al2O3, mullite or porous metals such as CrNi steels, bronzes or Ni basic alloys. It is also possible to use ceramic materials or metals coated with protective, anti-stick or sliding coatings. They are used when application temperatures of more than 600° C. and/or higher mechanical strengths are needed. If during the operation a substantially oxygen-free gas is used for forming the gas cushion, it is also possible to use porous carbon materials such as graphite. The important aspect is the gas permeability in the case of a sufficiently fine porosity, preferably <50 µm, particularly preferably <20 µm pore diameter. Its permeability has proven to be a favorable measuring variable for characterizing the porous materials. Materials have proven to be particularly suitable for the production of the gas-permeable parts of the mandrel which comprise a permeability of between $10^{-11}$ and $10^{-16}$ m$^2$, as measured on a material sample with a thickness of 5 mm. Coarser pores or higher permeability lead to the consequence that the gas film can be penetrated locally, thus producing local contact between the glass and the shaping surfaces, leading to damage to the glass part to be formed and, optionally, the apparatus. Lower permeabilities require very high supply gas pressures and thus lead to an unnecessarily high amount of effort.

Gas-permeable graphite has proven to be a particularly suitable material which comprises a pore size <20 µm and a permeability of between $10^{-14}$ and $10^{-16}$ m$^2$.

Any desired gas can be used. For reasons of cost-effectiveness it is recommended to use compressed air, especially in cases when the materials of the mandrel do not change oxidatively at the application temperatures. In the case of carbon materials which are attacked by atmospheric oxygen at temperatures above 400° C., nitrogen is preferably used. This gas is available at acceptable costs.

When using compressed air, nitrogen or other inert gases, no undesirable changes occur on the surface of the glass. If reactions are to be produced intentionally between the gas and the glass surface, reactive gases can also be used. For example, the use of $SO_2$ is possible if a coating made of $NaSO_4$ is to be produced on the surface. This gas can be used for locally increasing mechanical endurance of the glass surface because the surface layers of the glass are depleted of alkalis.

If larger glass parts are to be shaped with the method in accordance with invention, respectively larger apparatuses are used. If the surfaces on which the gas cushion forms during the shaping form a contiguous surface of larger than 1 cm², it may be advantageous to introduce grooves or channels into said surfaces in which the gas emerging from the shaping surface can be removed in a controlled manner. Said structures must be arranged in such a way that they do not leave any undesirable traces in the glass part during the shaping.

The method in accordance with the invention can also easily be used for producing parts of tube ends of thermoplastic materials other than glass. The invention is now explained in closer detail by reference to the enclosed drawing, wherein:

FIG. 1 schematically shows a sectional view of an inside mould made of porous material as well as an outside mould;

Figure 1:
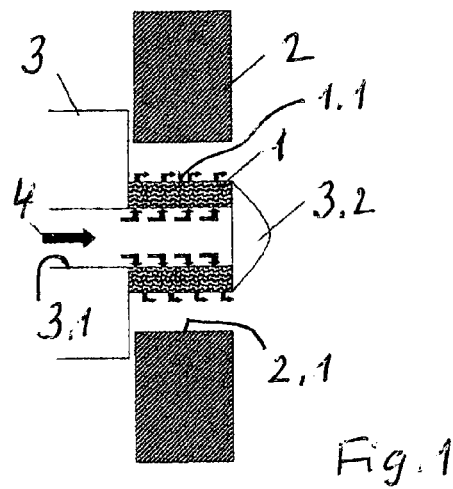
FIG. 1 shows the following in detail.

The apparatus comprises an inner shaping tool 1 and an outer shaping tool 2.

The inner shaping tool 1 has the shape of a cylindrical sleeve. It consists of an open-pored material such as graphite. Other materials can also be used such as sintered metal.

The outer shaping tool 2 is disposed at a certain radial distance from the inner shaping tool 1. It consists of at least one, preferably two or more single parts which can each be moved radially towards the inner shaping tool 1. In the advanced state, its contour which faces the parts to be shaped is transferred on to the outside of the glass part to be produced.

The outer shaping tool is made in the present case of a gas-impermeable material, preferably steel. It comprises an inner shaping surface 2.1. The facing shaping surface 1.1 of the inner shaping tool however is gas-permeable as a result of the choice of the open-pored material, The inner shaping surface 2.1 is provided with a contour which is transferred during shaping on to the part to be shaped. Although the drawing shows a straight shaping surface, elevations and/or recesses can be present on the shaping surface, The inner shaping tool 1 is associated with a fixing device 3. The fixing device 3 can be connected with the inner shaping tool 1, so that an axial sliding movement of said two parts is possible, namely inner shaping tool 1 and fixing device 3. Notice should be taken of the fixing cap 3.2 which is a component of the fixing device 3 and rests on the entire face surface on the right-hand side of the inner shaping tool 1 and seals the inner shaping tool 1 in a pressure-sealed manner By detaching the fixing cap 3.2 it is possible to easily exchange the inner shaping tool 1 in the case of wear and tear.

The fixing device forms together with a longitudinal bore a guide duct 3.1 for introducing and guiding compressed gas. Refer to arrow 4 which shows a compressed gas stream. During operation, the compressed gas stream reaches the inner jacket surface of the inner shaping tool 1, passes through its open-pored material, and reaches the shaping surface 1.1 through which it can pass.

The indicated arrangement and allocation of fixing device 3 and the inner shaping tool 1 is chosen in such a way that a rapid exchange of the inner shaping tool 1 can be performed in the case of wear and tear.

The apparatus according to FIG. 1 works as follows:

An object not shown here (which is made of glass, glass ceramics or any other thermoplastic material) which comprises a substantially tubular end is softened at its tubular end by the supply of heat so that it is deformable in a plastic manner. The individual parts of the outer shaping tool 2 are distanced in the radial direction from the inner shaping tool.

Then the inner shaping tool 1 is pushed into the softened tube end and the outer shaping tool 2 is applied to the outer jacket surface of the tube end, such that the individual parts of the outer shaping tool are moved in the direction towards the inner shaping tool.

A compressed gas stream is applied in the described manner prior to the insertion of the inner shaping tool 1 or during its insertion. Said compressed gas stream passes through the porous material of the inner shaping tool 1, emerges from it shaping surface 1.1, and forms a gas cushion between the inner shaping surface 1.1 and the adjacent inner surface of the tube end. A very thin, but still supportive gas film is formed which prevents the contact between the glass and the shaping surface 1.1.

Figure 2:
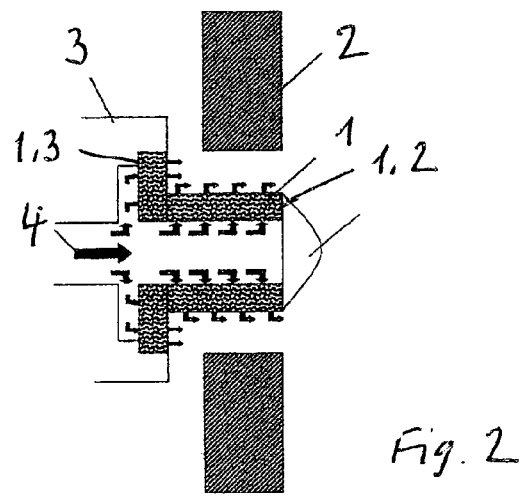
FIG. 2 shows an apparatus of a structure which is similar to that of FIG. 1, but with a slightly altered inside mould.

In the embodiment according to FIG. 2 the inner shaping tool 1 comprises a sleeve-like section 1.2 and a collar 1.3. As a result of a respective arrangement of the fixing device 3, the collar 1.3 is also charged with compressed gas during operation. The shaping surface 1.1 is formed in this case not only by sleeve 1.2, but also by the collar 1.3. A defined face surface can thus be shaped in the tube end to be processed.

Figure 3:
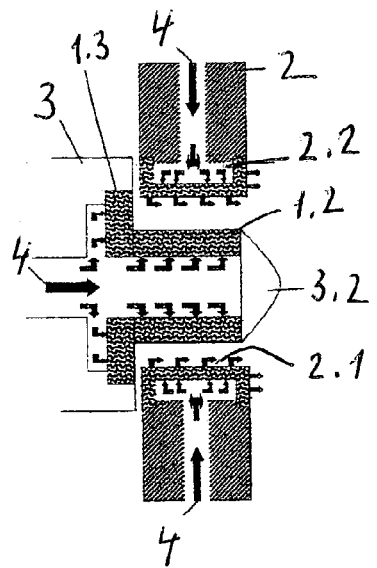
FIG. 3 shows an apparatus similar to that of FIG. 2, but with an outside mould which is partly arranged of porous material.
Figure 4:
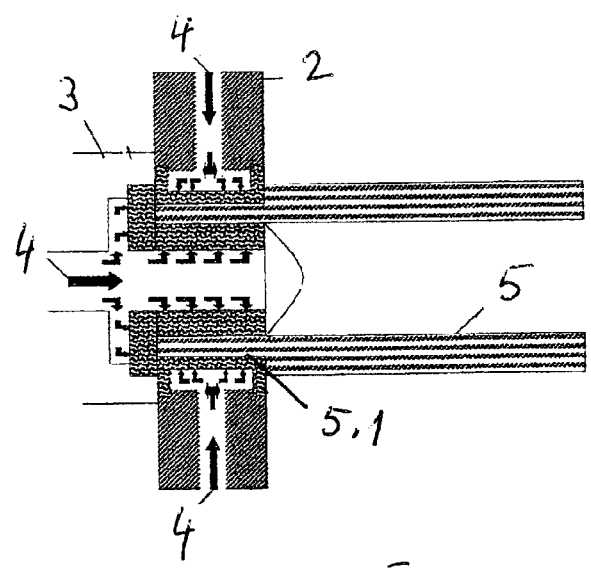
FIG. 4 shows the object of FIG. 3 during the shaping of a tube end.

The following conditions are obtained in the embodiments according to FIGS. 3 and 4:

In both cases the inner shaping tool 1 is arranged the same as or similarly to the apparatus according to FIG. 2. The inner shaping tool 1 thus again comprises a sleeve-like section 1.2 and a collar 1.3. It also consists entirely of open-pored material, as in the apparatus according to FIG. 2.

In addition, the outer shaping tool is produced in the region of its shaping surface 2.1 of open-pored material. It also comprises a compressed gas connection (or several compressed gas connections). Refer again to arrows 4 which illustrated the compressed gas streams.

FIG. 4 shows a glass object 5. It is provided with a tubular arrangement. Its end section 5.1 illustrated between the shaping tools 1 and 2 forms the area to be shaped of the glass part to be produced.

LIST OF REFERENCE NUMERALS

1. Inner shaping tool
1.1 Shaping surface
1.2 Sleeve
1.3 Collar
2 Outer shaping tool
3 Fixing device
3.1 Duct
3.2 Fixing cap
4 Compressed gas stream
5 Glass object
5.1 End zone of object

The invention claimed is:

1. A method for shaping a tubular object made of thermoplastic material, comprising the steps:

heating an object up to its softening point;

providing an inner shaping tool comprising a shaping surface, said shaping surface comprising an open-pored material having a porosity of 50 μm or less with a permeability of between $10^{-11}$ and $10^{-16}$ m²;

providing an outer shaping tool comprising an outer shaping surface, said outer shaping tool shaping surface comprising an open pored material having a porosity of 50 μm or less with a permeability of between $10^{-11}$ and $10^{-16}$ m²;

wherein said inner shaping tool shaping surface and said outer shaping tool shaping surface are positioned spaced apart and adjacent each other to hold the object therebetween;

conducting a free-flowing pressurized medium through the open-pored material towards the surface of the object to be shaped;

introducing the inner shaping tool into the object; and applying the outer shaping tool on to the object in order to shape the same by moving the parts thereof in the direction towards the inner shaping tool.

2. The method of claims 1 wherein the shaping surface comprises an open pored material having a porosity of 20 μm or less.

* * * * *

UNITED STATES PATENT AND TRADEMARK OFFICE
CERTIFICATE OF CORRECTION

| | | |
|---|---|---|
| PATENT NO. | : 7,392,667 B2 | Page 1 of 1 |
| APPLICATION NO. | : 10/284864 | |
| DATED | : July 1, 2008 | |
| INVENTOR(S) | : Christian Kunert et al. | |

It is certified that error appears in the above-identified patent and that said Letters Patent is hereby corrected as shown below:

On the title page item (75), line 4, under Inventors, delete "Egnach" and insert -- Amriswil --.

On the title page item (57), line 6, in the abstract, delete "The" and insert -- the --.

On the title page item (57), line 16, in the abstract, after "same" insert -- . --.

Signed and Sealed this

Twenty-fourth Day of March, 2009

JOHN DOLL
*Acting Director of the United States Patent and Trademark Office*